UNITED STATES PATENT OFFICE.

CHARLES FREDERICK CROSS, EDWARD JOHN BEVAN, AND CLAYTON BEADLE, OF LONDON, ENGLAND.

MODIFICATION OF CELLULOSE AND METHOD OF PREPARING SAME.

SPECIFICATION forming part of Letters Patent No. 604,206, dated May 17, 1898.

Application filed August 16, 1893. Serial No. 483,279. (No specimens.)

*To all whom it may concern:*

Be it known that we, CHARLES FREDERICK CROSS, EDWARD JOHN BEVAN, and CLAYTON BEADLE, subjects of the Queen of Great Britain, residing at No. 4 New Court, Lincoln's Inn, in the city of London, England, have discovered a new and useful modification of cellulose having peculiar properties which render it of great value in the industrial arts and method of preparing the same, as set forth in the following specification.

In our Patent No. 520,770, granted June 5, 1894, we have already described a plastic viscid compound of cellulose which is soluble in water and have therein set forth the method of its manufacture. The subject of the present application is a structureless insoluble modification of cellulose recovered through the decomposition of the plastic compound of cellulose which forms the subject of the previous patent. We have discovered that the novel product described in this previous patent and consisting of a plastic or viscid compound of cellulose and which is soluble in water may, by subsequent treatment in various manners, as by heat, be decomposed with recovery of the cellulose in a structureless insoluble modification which permits of many useful applications. This decomposition of the plastic compound may be easily effected by many means—as, for example, by weak acids, or by a moderate degree of heat, or by exposure to steam at the ordinary temperature—or the decomposition may even occur spontaneously on standing and the inorganic products of the decomposition, together with the by-products of the interaction of the original reagents, may be removed by washing or in other suitable manner in the adaptation of the structureless cellulose to various uses in practice.

We have already stated in our patent above referred to that the novel product therein described and claimed is plastic and may be rolled into sheets or otherwise worked or molded, or that it may be distended or dissolved in water. By virtue of these properties it thus becomes possible to work the material into sheets and other desirable forms after the manner which will readily occur to those skilled in the art of working such plastic materials as celluloid or rubber, but the softness, solubility, and odor of the material unfit it for many uses. By means of our present invention we are enabled, after having brought the material into the desired form, to recover from it the original or slightly-modified insoluble cellulose in a structureless condition, which may be applied to many additional and very useful purposes in the arts and which is entirely free from the objectionable features of the plastic and soluble compound of cellulose.

We are aware that for a long time prior to our discovery it has been known that the compound of cellulose known as "nitrocellulose" and possessing dangerous and explosive properties may be rendered plastic by manipulation with camphor or suitable solvents, so that it may be rolled or otherwise worked for the production of celluloid, zylonite, &c. The plastic material which we have discovered is non-explosive, soluble in water, and less combustible than the cellulose from which it was derived, and it may be made to yield by its decomposition the original or slightly-modified cellulose in a structureless form possessing among others the desirable physical properties of celluloid, zylonite, &c., although entirely free from their objectionable chemical properties, and it is this structureless modification thus derived which forms the subject of the present application. In order to obtain the cellulose in this new and desirable form, the original cellulose may be taken in either its natural or purified form and treated as set forth in our Patent No. 520,770, above referred to, for the production of the plastic soluble compound of cellulose which forms the subject of that patent. This plastic compound may then either be rolled out into sheets or otherwise brought to the desired shape. It is then, by preference, dried, and if the degree of heat has not been sufficient to decompose the compound with separation of the cellulose in the insoluble form the compound may then be decomposed in any suitable manner—as, for example, by exposure to a heat of about 212° or by exposure to steam at the same temperature, the length of time in either case being determined by the thickness of the material; but it should in any case be prolonged until the decomposition is effected, as is shown by the cellulose becoming insoluble. The structureless cellulose thus obtained may be freed from the inorganic products of the decomposition, together with the by-products of the interaction of the original reagents, by washing with water or in other suitable manner, as may be desirable in view of the use to which the material is to be put. The material thus prepared shrinks somewhat on drying and may, unless treated, become brittle when dried. In order, therefore, to prepare sheets which shall retain their flexibility, we soak the material in glycerin or glycerin and water after it has been washed. Sheets thus prepared and suitably colored may be made to closely imitate leather. The stiffness of the product may be increased by using less glycerin or none at all, and by manipulating and coloring in suitable ways products may be obtained which resemble closely celluloid, whalebone, hard rubber, horn, tortoise-shell, and the like.

In order to recover the cellulose, it is only necessary to effect the decomposition of the plastic compound, and this may be easily accomplished, either after the manner previously set forth in this specification or in any other suitable way, as will readily occur to chemists, and we do not intend by anything herein to limit ourselves as to the manner of effecting such decomposition.

What we claim is—

1. The structureless insoluble modification of cellulose recovered through the decomposition of the soluble plastic compound hereinbefore described.

2. The process herein described consisting in first treating cellulose to form the soluble plastic compound described hereinbefore, and then decomposing the plastic compound thus obtained, substantially as set forth.

3. The process herein described consisting in first treating cellulose with caustic alkali and carbon disulfid, and then decomposing the plastic compound thus obtained, substantially as set forth.

4. A structureless insoluble modified cellulose obtained by first treating cellulose, with caustic alkali and carbon disulfid, and then decomposing the soluble mass thus obtained to obtain the modified cellulose.

In testimony whereof we affix our signatures in presence of two witnesses.

CHARLES FREDERICK CROSS.
EDWARD JOHN BEVAN.
CLAYTON BEADLE.

Witnesses:
WILMER M. HARRIS,
THOMAS LAKE.